United States Patent

[11] 3,564,969

| [72] | Inventor | Rudolf J. A. Kimmelaar |
| | | Vlaardingen, Netherlands |
| [21] | Appl. No. | 817,412 |
| [22] | Filed | Apr. 18, 1969 |
| [45] | Patented | Feb. 23, 1971 |
| [73] | Assignee | Cincinnati Milacron Inc. |
| | | Cincinnati, Ohio |

[54] QUICK TOOL-CHANGE HEADSTOCK
4 Claims, 4 Drawing Figs.

[52] U.S. Cl. .................................................. 90/11,
279/90
[51] Int. Cl. ...................................... B23c 1/00,
B23b 31/10
[50] Field of Search .................................. 90/11.1;
279/90, 89, 1 (B); 77/3, 4

[56] References Cited
UNITED STATES PATENTS
| 3,288,032 | 11/1966 | Pankonin et al. | 90/11X |
| 3,405,950 | 10/1968 | Cox | 90/11X |

FOREIGN PATENTS
| 600,537 | 6/1960 | Canada |

*Primary Examiner* — Gil Weidenfeld
*Attorneys* — Howard T. Keiser and Roy T. Montgomery

ABSTRACT: A quick tool-change headstock having a tensioning ring having lips which interact with the flange of the toolholder, a second ring which interacts on the one hand with the end of the toolholder that is situated opposite the head of the tensioning ring and on the other hand with a stop ring mounted on the housing, and cup springs fitted between the second ring and the flange of the spindle-end.

PATENTED FEB 23 1971

INVENTOR.
RUDOLF J.A. KIMMELAAR

BY Howard T. Keiser
Roy T. Montgomery
ATTORNEYS

QUICK TOOL-CHANGE HEADSTOCK

BACKGROUND OF THE INVENTION

The invention relates to a quick tool-change headstock mounted on the spindle-head of a milling, drilling or fluting machine, with an embodied quill for pulling the flanged tool-holder tight in the spindle-head.

The constructions known so far make use of a nut which, on being turned, transmits a pressure to the tool-holder via its flange. These known constructions show the following drawbacks: (1) Turning is effected by means of a spanner, which takes time during changing of the tool. Also, the pressure depends upon the force exerted by the operating personnel. (2) The tool-holder has to be specially machined in order to obtain a precise dimension, within the permissible tolerance, from the cone to the front of the flange. This is essential because the turning of the nut has to be effected within certain limits, as the lip of the nut must not be allowed to drop into the aperture of the flange. (3) The lip of the nut, when turned, rubs against the flange, thereby causing wear-and-tear therebetween.

SUMMARY OF THE INVENTION

In order to eliminate the aforementioned drawbacks it is proposed according to the invention to provide a quick tool-change headstock having a tensioning ring having lips which interact with the flange of the tool-holder, a second ring which interacts on the one hand with the end of the tool-holder that is situated opposite the head of the tensioning ring and on the other hand with a stop ring mounted on the housing, and cup springs fitted between the second ring and the flange of the spindle-end.

DESCRIPTION OF THE PREFERRED EMBODIMENT

Figure 4:
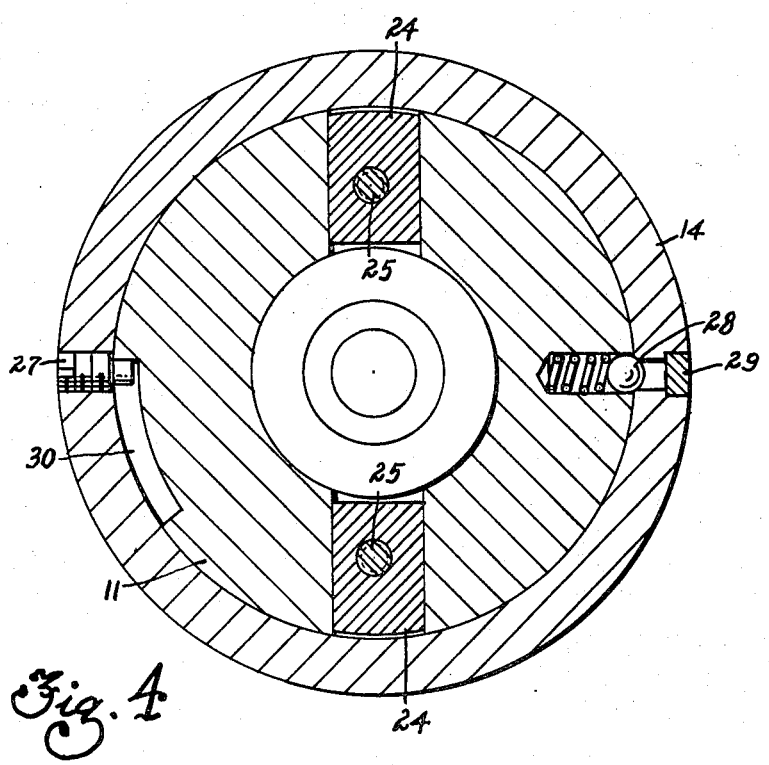
FIG. 4 is a cross section through line IV–IV in FIG. 1.

Mounted in the conical part of spindle-head 11 is a tool-holder 12 provided with a flange 13. Furthermore, the quick tool-change headstock has a tensioning ring 14 provided with two inward radially extending lips 15, which tensioning ring can move in the axial direction and can also rotate with respect to the spindle head 11. A second ring 17 interacts with the tensioning ring 14 via the ball bearing ring 16, as a result of which the tensioning ring 14 can turn with respect to the spindle head 11. The second ring 17, however, can only move in the axial direction with respect to the spindle head 11, and is secured against turning by pins 18 in slots 18a and holes 18b. Turning of the tensioning ring 14 is effected only through an angle of 30°, which is due to the presence of a stopping means formed by a groove 30 in the spindle-head and a screw 27 in the tensioning ring 14 (shown best in FIG. 4). This stopping means also provides the position at which the lips 15 of the tensioning ring 14 have to occupy in order to be facing the recesses 13a in the flange 13 of the tool-holder 12. Between ring 17 and the flange 11a of the spindle-head 11 there are two disc or Belleville springs 19. The numeral 20 denotes a waring ring, whilst 21, 22, and 23 are respectively a felt closure and felt rings which prevent the intrusion of shavings into the mechanism. Numeral 24 denotes keys which serve to secure the tool-holder 12 against turning and which fit into recesses 13a of the flange 13 of the tool-holder 12. By means of bolts 25, these keys 24 are fixed to the spindle-head 11. A stop ring 26 is fixed to the headstock 10. Numeral 28 denotes a spring-ball securing mechanism and 29 a closure plug.

Figure 1:
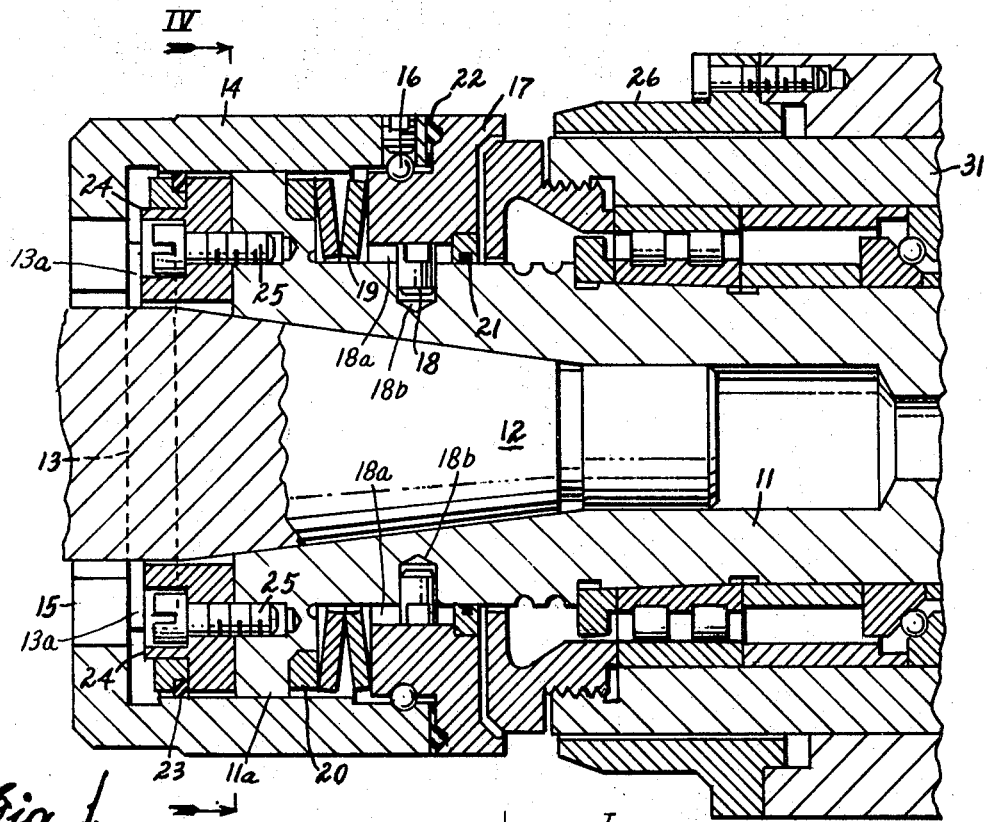
FIG. 1 is a cross-sectional view taken along the line I–I in FIG. 2 of the quick tool-change headstock, in which the tool-holder is clamped in position in the spindle-end.
Figure 2:
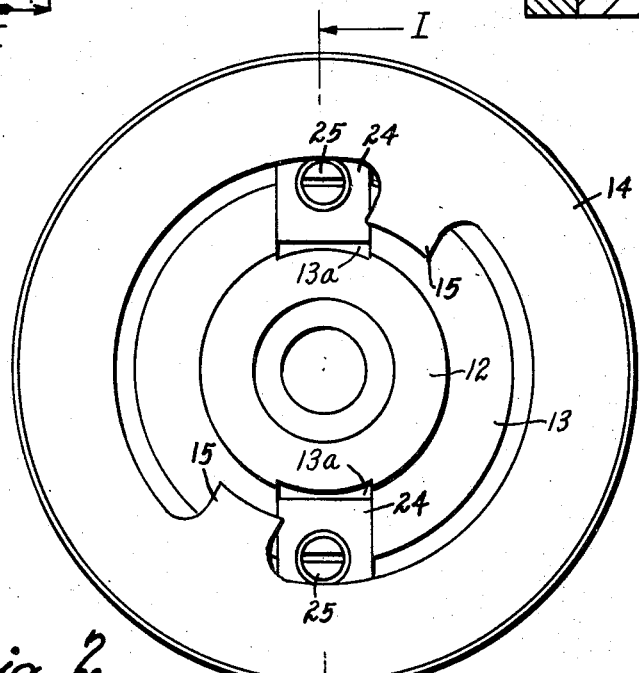
FIG. 2 is a front view of the quick tool-change headstock shown cross-sectionally in FIG. 1.
Figure 3:
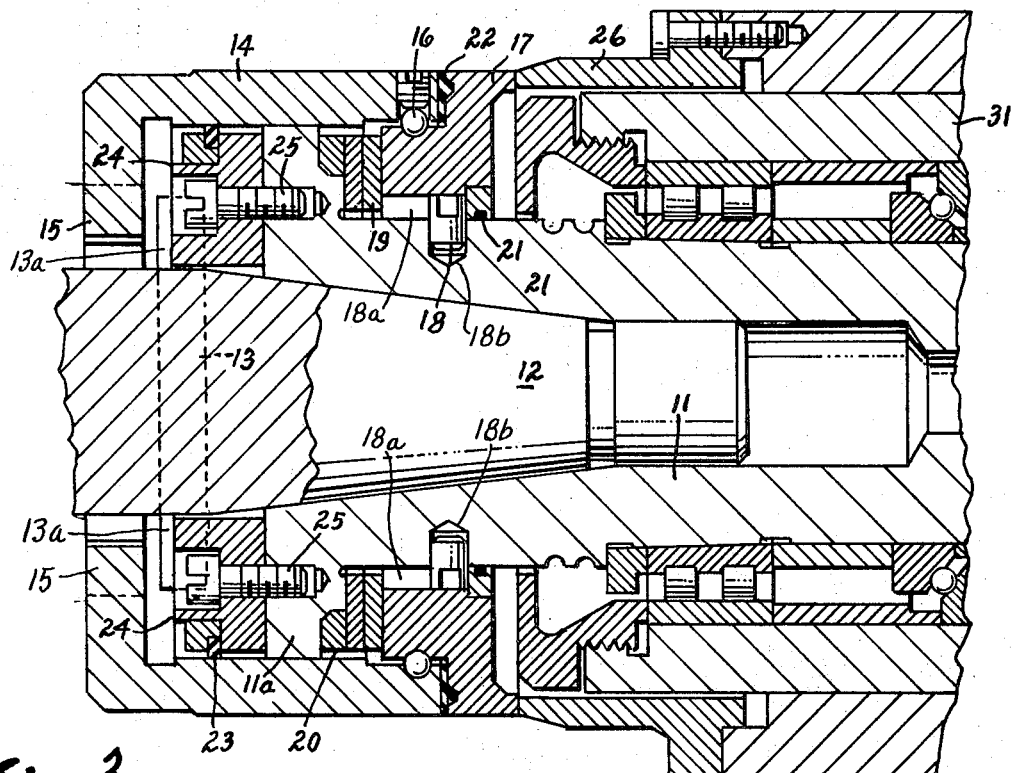
FIG. 3 is the quick tool-change headstock in cross section, but with the flange of the tool-holder situated clear of the lips of the tensioning ring.

The operation of the quick tool-change headstock is as follows:

When the tool 12 is to be changed, the quill 31 is drawn back to the right which can be effected manually via a hand-turned toothed wheel, a worm and worm-wheel gear or hydraulically via a hydraulic motor, a gear wheel and a worm and worm-wheel gear, or by other means. If this withdrawal is effected hydraulically it can be stopped via an end switch, at which moment the spindle motor stops working, so that the spindle-head is no longer driven. The quill 31 may be withdrawn to such an extent that ring 17 lies against the stop ring 26. On further withdrawal of the quill, (FIG. 3) the cup springs 19 are pressed in and, at the same time, the tensioning ring 14 is shifted via the ball guide 16, as a result of which lips 15 of the tensioning ring 14 are released from flange 13 of tool-holder 12. At that moment the tensioning ring 14 is free from forces originating from the Belleville springs 19 and the frictional forces on the lips 15 and the ball bearing ring 16. In this way, the tensioning ring 14 can be turned radially by hand up to the stopping means, as a result of which the lips 15 of the tensioning ring 14 come into position in front of the recesses 13a in the flange 13 of the tool-holder 12, so that the latter can be taken out. The Belleville springs are then pressed inward to the maximum extent (see FIG. 3). The axial shift of the tensioning ring 14 is approximately 4 mm. and is therefore sufficient to enable standard tool-holders to be clamped in position without additional machining of the flange of the tool-holder 12.

For fitting a fresh tool with its holder the following operations are performed:

The new tool-holder 12 is placed in the end of the spindle head 11. Then the tensioning ring 14 is turned clockwise through an angle of 30° until it comes up against screw 27, in which position it is secured by a spring-ball detent mechanism 28. On shifting the quill to the left the ring 17 is pushed back by the Belleville springs 29, while at the same time the tensioning ring 14 is shifted in position via the ball bearing ring 16. This is effected until lips 15 of the tensioning ring 14 keep the tool-holder 12 pressed into the conical part of spindle-head 11. As a result, this holder 12 is held firmly in consequence of the spring pressure of the Belleville springs and the spindle-head. At that moment ring 17 is released from the stop ring 26. The spindle-driving motor can then be started and the machine is ready for operation.

If the quill 11 is moved by hand, the end switch (not shown in the drawings) should be switched into circuit when ring 17 is about 12 mm. away from the stop ring 16. The end switch serves to stop the spindle-driving motor. The end switch remains in circuit on further shifting of the quill 11 towards the housing and will thus keep the motor dead regardless of the actions of the operating personnel. The object of the foregoing is to prevent the rotating ring 17 from being carried along by the spindle-head and thus comes into contact with the stop ring 26. On moving the quill forward after the actions for changing the tool have been performed, the tool-holder 12 is clamped by the Belleville springs and spindle-head 11, the end switch is released by a cam on the quill (not shown in the drawing) and the spindle-head motor can be started.

The proposed new headstock for quick tool-change is thus constructed in such a way that the tensioning force delivered by the cup spring is transmitted via the tensioning rings and the lips to the flange of the tool-holder.

I claim:

1. In a machine tool having a flange rotatable spindle for carrying a flanged tool-holder in driving engagement therewith, said spindle being carried in an axially extendable and retractable quill, a quick tool-change headstock comprising:
    a. a ring rotatably fixed to and axially movable on the spindle;
    b. a tension ring rotatably connected to said ring, said tension ring having two radially inward extending lips which contact the flange of the tool-holder to hold said tool-holder in the spindle when said lips are biased thereagainst;

c. yieldable means interposed between the flange of the spindle and said ring to bias the lips of said tension ring against the flange of said tool-holder; and d. a stop member mounted to contact said ring and compress the yieldable means to release the lips from the flange of the tool-holder, said stop member being rendered operable when the quill is retracted.

2. A quick tool-change headstock as claimed in claim 1 further comprising a second stop member interposed between said tension ring and the spindle to restrict rotation of said tension ring to an angle of 30°.

3. A quick tool-change headstock as claimed in claim 1 wherein said yieldable means comprises at least two disc springs.

4. A quick tool-change headstock as claimed in claim 1 further comprising a ball bearing ring interposed between said ring and said tension ring to allow relative rotation therebetween.